US010537069B2

(12) United States Patent
Wykman et al.

(10) Patent No.: US 10,537,069 B2
(45) Date of Patent: Jan. 21, 2020

(54) ARRANGEMENT FOR AUTOMATIC ADJUSTMENT OF A SPACING BETWEEN CUTTING BLADES

(71) Applicant: HUSQVARNA AB, Huskvarna (SE)

(72) Inventors: Tomas Wykman, Jönköping (SE);
Joakim Persson, Skillingaryd (SE);
Anders Hansson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/556,395

(22) PCT Filed: Mar. 13, 2015

(86) PCT No.: PCT/EP2015/055285
§ 371 (c)(1),
(2) Date: Sep. 7, 2017

(87) PCT Pub. No.: WO2016/146146
PCT Pub. Date: Sep. 22, 2016

(65) Prior Publication Data
US 2018/0042184 A1    Feb. 15, 2018

(51) Int. Cl.
*A01G 3/053*    (2006.01)
*A01G 3/047*    (2006.01)
*B26B 13/28*    (2006.01)

(52) U.S. Cl.
CPC ............ *A01G 3/053* (2013.01); *A01G 3/0475* (2013.01); *B26B 13/28* (2013.01)

(58) Field of Classification Search
CPC ........ A01G 3/053; A01G 3/04; A01G 3/0475; B26B 13/28; F16B 43/009

(Continued)

(56) References Cited

U.S. PATENT DOCUMENTS

| 2,741,844 A * | 4/1956 | Sejman .................. B26B 13/28 |
| | | 30/268 |
| 3,747,212 A * | 7/1973 | Krayl ..................... B26B 19/06 |
| | | 30/221 |

(Continued)

FOREIGN PATENT DOCUMENTS

| EP | 2294907 A1 | 3/2011 |
| GB | 618081 A | 2/1949 |
| JP | 3162801 U | 8/2010 |

OTHER PUBLICATIONS

International Search Report and Written Opinion ofInternational Application No. PCT/EP2015/055285 dated Dec. 1, 2015, all enclosed pages cited.

(Continued)

*Primary Examiner* — Ghassem Alie
*Assistant Examiner* — Bharat C Patel
(74) *Attorney, Agent, or Firm* — Burr & Forman, LLP

(57) ABSTRACT

Adjustment device for automatic adjustment of a spacing between a first and a second cutting blade. The adjustment device includes a connector extending through a recess in the respective first and second cutting blades at right angles to the first and second contact surfaces and arranged to guide the movement of the displaceable cutting blades relative to the other cutting blade. The adjustment device further includes a first stop fixed to one end of the connector and arranged in contact with the outer surface of the second cutting blade, and an adjustment means located at the opposite end of the connector and arranged to apply a pre-tensioning force on the outer surface of the first cutting blade and maintain first and second contact surfaces of the first and second cutting blades in contact.

13 Claims, 11 Drawing Sheets

(58) Field of Classification Search
USPC ........ 30/221; 403/91, 92, 97, 105, 107, 108; 411/535–536
See application file for complete search history.

(56) References Cited

U.S. PATENT DOCUMENTS

| | | | | | |
|---|---|---|---|---|---|
| 4,062,203 | A | * | 12/1977 | Leonard | B25B 23/141 464/38 |
| 4,251,916 | A | * | 2/1981 | Linden | B26B 13/28 30/268 |
| 4,708,555 | A | * | 11/1987 | Terry | F16B 39/24 411/149 |
| 4,957,235 | A | * | 9/1990 | Beno | B26D 1/30 108/25 |
| 4,989,324 | A | * | 2/1991 | Andis | B26B 19/06 30/216 |
| 5,615,585 | A | * | 4/1997 | Chi | B62J 99/00 180/24.1 |
| 5,984,602 | A | * | 11/1999 | Park | F16B 39/284 411/154 |
| 6,524,026 | B2 | * | 2/2003 | Sondrup | E02D 29/1409 404/26 |
| 6,892,604 | B2 | * | 5/2005 | Tison | B62K 21/06 280/279 |
| 6,966,735 | B1 | * | 11/2005 | Yamazaki | F16B 39/24 411/131 |
| 7,069,812 | B1 | * | 7/2006 | Rettig | B62K 21/16 280/279 |
| 7,168,902 | B2 | * | 1/2007 | Terry | F16B 31/04 411/149 |
| 7,406,770 | B2 | * | 8/2008 | Mace | A01D 34/14 30/216 |
| 8,028,423 | B2 | * | 10/2011 | Matsuo | A01G 3/053 30/216 |
| 8,104,183 | B2 | * | 1/2012 | Nakamura | B27B 9/02 30/375 |
| 8,328,491 | B2 | * | 12/2012 | Bucknell | B25B 29/02 411/432 |
| 8,690,109 | B2 | * | 4/2014 | Haworth | F16B 43/009 248/218.4 |
| 9,011,060 | B2 | * | 4/2015 | Hyatt | F16B 43/009 411/136 |
| 2011/0061241 | A1 | | 3/2011 | Jian | |
| 2011/0318140 | A1 | * | 12/2011 | Chang | B62K 21/16 411/535 |

OTHER PUBLICATIONS

Chapter II International Preliminary Report on Patentability of International Application No. PCT/EP2015/055285 dated Jan. 24, 2017, all enclosed pages cited.

* cited by examiner

A-A

A-A

ARRANGEMENT FOR AUTOMATIC ADJUSTMENT OF A SPACING BETWEEN CUTTING BLADES

TECHNICAL FIELD

The present invention relates to an arrangement for automatic adjustment of a spacing between a first and a second cutting blade in order to maintain the first and second contact surfaces in contact or in near contact.

BACKGROUND

Known trimmer constructions comprise cooperating cutting blades that are moved against each other, to cause cutting edges on the cutting blades to interact to effect cutting of material, such as vegetation. In one exemplary form, the separate cutting blades are elongated and have cooperating surfaces that are guided to move against each other to produce a cutting action as the cutting edges thereon are caused to repetitively interact with a scissors-type action. Ideally, the cutting blade surfaces move, one against the other, without excessive binding. Examples of mechanisms for this purpose are described below.

In one design, the cutting blades are operatively connected to a support bar on a frame associated with a drive mechanism, such as an internal combustion engine or an electric motor. A number of bolts are directed through recesses in the cutting blades and are connected to the support bar by threaded fasteners so that the blades are held between the support bar and the heads of the bolts. The bolts are tightened and then released ¼ to ½ turn to allow sufficient clearance between the blades, allowing them to be guided against each other without significant resistance. This mechanism has an advantage that it allows the spacing between the blades to be changed with wear thereof, which increases the clearance to beyond an optimal amount. As the clearance increases over a certain amount, the cutting effectiveness may diminish. The blades may at some point be prone to jamming if and when material wedges between the cooperating surfaces. A problem with this system is that the adjustment must be made by the end user in the field. Some users may find the adjustment process difficult or confusing, whereas others may not wish to take the time necessary to adjust the bolts.

In an alternative design, a rigid spacer may be fixed between a support bar and the bottom cutting blade. A bolt is tightened until the relationship between the support bar and bottom blade is fixed. This space is not adjustable and therefor is fixed as dictated by the configuration of the spacer. Over time the repetitive cutting action of the blades in contact with each other, will cause wear that increases the spacing between the cooperating cutting blade surfaces. Eventually, the clearance between the blade surfaces will be such that the blades are detrimentally movable away from each other to the point that the cutting blades will not effectively sever the material for which they are designed or become jammed by material that is being cut.

Hence, there is a need for an arrangement that at least partially mitigates the above problems. The object of the invention is to provide an improved relating to spacing between cutting blades caused by wear.

SUMMARY

The above problems are solved by an arrangement as described in the attached claims.

In one form, the invention is intended for use in a cutting device, such as a trimmer, having first and second cutting blades. The first cutting blade has a generally flat first contact surface located in a first plane and a first cutting edge. The second cutting blade has a generally flat second contact surface located in a second plane and a second cutting edge. The first and second cutting blades are mounted so that the first and second flat surfaces face and are in contact and are substantially parallel to each other. A drive unit causes at least one of the first and second cutting blades to move relative to the other of the first and second cutting blades to thereby produce a repetitive cutting action between the first and second cutting edges. As indicated above, the drive unit can be an internal combustion engine or an electric motor. At least one fastening assembly has first and second facing support bars between which the first and second cutting blades are guided. The first and second facing support bars are spaced from each other a predetermined distance and are preferably arranged to maintain the first and second flat cutting blade surfaces in contact against each other; or at least to establish a maximum allowable spacing between the first and second flat cutting blade surfaces. The at least one fastening assembly further has at least one arrangement for automatic adjustment of the spacing that either maintains a desired spacing under the action of a biasing force, or produces a pre-tensioning force that urges the first and second planar cutting blade surfaces towards each other. In this context the term "spacing" is used to describe a spacing between two surfaces, which spacing can range from zero (close contact) and upwards to a desired maximum value.

According to a preferred embodiment, the invention relates to an arrangement for automatic adjustment of a spacing between a first and a second cutting blade. The first cutting blade has a planar first contact surface, an opposite first outer surface and comprises at least one first cutting edge in a first plane coinciding with the first contact surface. Similarly, the second cutting blade has a planar second contact surface, an opposite second outer surface and comprises at least one second cutting edge in a second plane coinciding with the second contact surface. The first and second cutting blades are mounted so that the first and second contact surfaces are maintained parallel to each other with a predetermined spacing; wherein at least one of the first and second cutting blades is displaceable to produce a cutting action between the first and second cutting edges.

The first and second cutting blades can be connected by at least one adjustment device arranged to maintain contact between the first and second planar contact surfaces. The adjustment device comprises a connector extending through a recess in the respective first and second cutting blades at right angles to the first and second contact surfaces. The connector can be arranged to guide the relative movement of the cutting blade along the axis of the connector during spacing adjustment. The connector may also be arranged to guide the reciprocating movement of the at least one displaceable cutting blade, but this function can be performed by separate means, such as bolts, which will not described in further detail. At least one of the cutting blades has elongated recesses to allow a reciprocating movement relative to the other cutting blade. Alternatively, both blades can be arranged to perform a reciprocating movement.

The adjustment device further comprises a first stop at one end of the connector and arranged in contact with the outer surface of the second cutting blade. The connector can be a suitable screw, bolt or pin, wherein the stop can be permanently fixed to or removably fixed or screwed onto the end of the connector. An adjustment means is located at the opposite end of the connector and is arranged to act on the outer surface of the first cutting blade. The adjustment means is either acted on by a biasing force, or is arranged to apply a biasing force on the outer surface of the first cutting blade, in order to maintain a spacing between the first and second contact surfaces in contact. Alternatively, the stop can be replaced by a second adjustment means, providing adjustment means on both sides of the first and second cutting blades of a cutting blade assembly.

The adjustment means comprises a first and a second element having interacting control surfaces, wherein the first and second elements are arranged to be displaceable relative to each other. In this context, this implies that either or both elements can be moved to achieve a relative displacement. At least one of the elements has an inclined control surface arranged at an angle to the contact surfaces of the first and second cutting blades. In addition, at least one element is spring loaded to effect a relative displacement between the first and second elements along said inclined control surface, wherein the relative displacement between the first and second elements causes a biasing force to be applied on the outer surface of the first cutting blade.

The interacting control surfaces are preferably self-locking, but not necessarily, in the direction of the connector, wherein separation of the first and second cutting blades is prevented, or at least inhibited. In this context, the wording "in the direction of the connector" corresponds to the main longitudinal extension of the connector at right angles to the first and second contact surfaces. Whether a machine is self-locking depends on both the friction forces (coefficient of static friction) between its parts, and the distance ratio $d_{in}/d_{out}$ (ideal mechanical advantage). If both the friction and ideal mechanical advantage are high enough, it will self-lock. This condition occurs when the efficiency $\eta$ of the mechanism is less than 50%. Self-locking occurs mainly in mechanisms with large areas of sliding contact between moving parts, such as screws, inclined planes and wedges. The interacting control surfaces can be inclined at a predetermined angle. Depending on the desired properties of the adjustment means the angle can be constant or varying. The angle of the inclined surfaces relative to the planes of the contact surfaces should be relatively small. This ensures contact or at least a desired spacing between the cutting blades while maintaining a relatively small contact force and a relatively low friction between the blades The interacting control surfaces can also comprise a series of steps ascending at a predetermined rate and separated by flat intermediate surfaces substantially parallel to the contact surfaces. Depending on the desired properties of the adjustment means the rate can be constant or varying. The height of each step can be selected to represent the maximum desired spacing between the first and second contact surfaces. The bodies are pre-tensioned relative to the each other by the biasing means but are prevented from relative displacement by the steps separating the intermediate surfaces. When the spacing is equal to or greater than the height of the steps the pre-tensioning force created by the biasing means will be sufficient to force one step over its corresponding facing step onto the next intermediate surface. Subsequently, relative displacement between the bodies will take place over a distance corresponding to the distance between two steps, and the pre-tensioning process is resumed. In order to achieve this step-wise displacement, the contacting surfaces between facing steps can be angled or have other suitable shapes, which angles or shapes can be selected dependent on factors such as the spring constant of the biasing means and/or the size of the intermediate surface between two steps. In this example, the contacting surfaces between facing steps form control surfaces, as facing intermediate surfaces will be out of contact with each other when the control surfaces engage. Depending on the shape of the steps, the contacting portions of the control surfaces can be in the form of an area, a line or a point. This stepwise adjustment allows the spacing to be maintained without increasing the contact force or friction between the blades.

Alternatively, one or both the first and the second elements have inclined, contacting control surfaces arranged at an angle to the contact surfaces. The contacting portions of interacting control surfaces can be in the form of an area, a line or a point. For instance, a flat control surface interacting with a spherical control surface would result in point contact.

At least one of the first and second elements is arranged to be displaceable in a plane parallel to the contact surfaces. During displacement of at least one of the first and a second elements is arranged to be along the at least one inclined control surface, the displaced element performs a movement directed simultaneously parallel to and at right angles to the first and a second contact surfaces. The distance between the first stop and the adjustment means is thereby reduced and a biasing force to be applied on the outer surface of the first cutting blade. Alternatively, both the first and the second elements are arranged to be displaceable in a plane parallel to the contact surfaces of the cutting blades and perform this movement.

According to a first example of the embodiment, the first element is arranged in the second end of the connector and comprises a recess with an inclined surface facing the first and second cutting blades. The recess preferably extends parallel to the contact surfaces of the cutting blades and has a cross-section that substantially conforms to the cross-section of the second element at its smallest end. The second element is located in a portion of the adjustment device attached to the first cutting blade, which cutting blade can be fixed or movable relative to the adjustment device. The second element comprises an elongated body extending from a cavity in the adjustment device into the recess in the first element into contact with the inclined surface. The elongated body forming the second element can have any suitable shape, such as a circular pin or an elongated cylindrical or rectangular wedge shaped body. The elongated body is displaceable in a plane parallel to the contact surfaces by a biasing means located in the cavity in the adjustment device. The biasing means effecting a spring loading of the second element can be a spring, such as a coiled spring, a stack of Belleville springs or a similar suitable resilient spring. Displacement of the second element causes the first element to be displaced away from the contact surfaces, which biases the second element and the stop at the first end of the connector towards the first and the second cutting blade, respectively, in order to maintain the spacing between the blades.

According to a second example of the embodiment, the adjustment device comprises adjustment means in the form of first and second elements comprising a first and a second rotationally symmetrical body each with an opening for the connector. The first and second elements are retained by a stop fixed to the second end of the connector and arranged in contact with the outer of the first and second rotationally symmetrical bodies. Alternatively, the stop can be replaced by a second adjustment means, providing adjustment means on both sides of the first and second cutting blades of a cutting blade assembly.

A biasing means is located between the control surfaces of the bodies, which biasing means is acting on a radial surface, a recess or a similar suitable surface on or in each of the corresponding bodies, wherein at least one of the bodies is rotatable relative to the other body. Each rotationally symmetrical body can be provided with at least one inclined surface having a maxima and a minima measured from a reference surface forming an outer planar surface remote from the facing inclined surfaces. The inclined surface can be helical and extend 360° around the control surface, wherein a radial surface forms a step in a plane parallel to the rotational axis of the body. Alternatively, the inclined surface can extend 180° around the control surface, wherein two diametrically located radial surface form steps in a plane parallel to the rotational axis of the body. Similar arrangements can include multiple inclined surfaces, wherein three inclined surfaces would extend 120° around the control surface, and so on. The angle of the inclined surfaces relative to the planes of the contact surfaces should be relatively small. This ensures contact between the cutting blades while maintaining a relatively small contact force and a relatively low friction between the blades.

Alternatively, instead of being inclined at a constant angle, the facing surfaces extending over 360°/180°/120°/etc. can be formed as a series of steps separated by arcuate sectors with flat intermediate surfaces substantially parallel to the contact surfaces. The height of each step can be selected to represent the maximum desired spacing between the first and second contact surfaces. The bodies are pre-tensioned relative to the each other by the biasing means but are prevented from relative rotation by the steps separating the substantially arcuate sectors. When the spacing is equal to or greater than the height of the steps the pre-tensioning force created by the biasing means will be sufficient to force one step over its corresponding facing step onto the next arcuate sector. Subsequently, relative rotation between the bodies will take place over an angle corresponding to an arc delimiting a surface between two steps, and the pre-tensioning process is resumed. In order to achieve this step-wise displacement, the contacting surfaces between facing steps can be angled or have other suitable shapes, which angles or shapes can be selected dependent on factors such as the spring constant of the biasing means and/or the size of the angle delimiting an arcuate surface between two steps. In this example, the contacting surfaces between facing steps form control surfaces, as facing arcuate sector will be out of contact with each other when the control surfaces engage. Depending on the shape of the steps, the contacting portions of the control surfaces can be in the form of an area, a line or a point. This stepwise adjustment allows the spacing to be maintained without increasing the contact force or friction between the blades.

An example of a suitable biasing means in this example is a torsion spring located on the connector, between the rotationally symmetrical bodies. A torsion spring exerts torque in a circular or rotating arc when the spring arms rotate about the central axis of the spring. The rotationally symmetrical bodies can be washers having a suitable thickness or nuts, which in the above example are freely rotatable about the connector. Displacement of the second element causes the first element and/or the second element to be displaced under the action of the biasing means, which pre-tensions the first element and the second element relative to each other. In this way the adjustment means and the stop at the first end of the connector are displaced towards the first and the second cutting blade, respectively, in order to maintain the spacing between the blades.

The invention further relates to a cutting device comprising a first cutting blade, having a planar first contact surface, an opposite first outer surface and comprising at least one first cutting edge in a first plane and a second cutting blade, having a planar second contact surface, an opposite second outer surface and comprising at least one second cutting edge in a second plane. The first and second cutting blades are mounted so that the first and second contact surfaces are in contact with and parallel to each other; wherein at least one of the first and second cutting blades is displaceable to produce a cutting action between the first and second cutting edges. A driving unit is arranged to act on at least one of the first and second cutting blades to produce the cutting action. The first and second cutting blades are interconnected by at least one bolt and nut assembly, or a similar suitable connecting means. According to the invention, at least one bolt and nut assembly is substituted by an adjustment arrangement as described above. The at least one adjustment arrangement can be situated on either one of the outer surfaces of the first and second cutting blades. Examples of suitable cutting device are, for instance, a powered hedge trimmer, a manual hedge trimmer, a cutting bar as well as gardening or industrial scissors.

The adjustment devices described in the above embodiments can be placed with the adjustment means on any side of a blade assembly, that is, it may be located on an upper or on a lower side of a blade assembly as indicated in FIG. 1. If multiple adjustment devices are used, then the adjustment means can all be located on one side or be located on alternate sides in any suitable combination. The location of the adjustment means can be determined by factors such as design constraints or access for servicing. Further, one or more adjustment devices can comprise an adjustment means on both sides of a blade assembly. Advantages with this arrangement is that the possible distance for adjustment is extended and/or that adjustment can be ensured even if one adjustment means should become clogged by debris.

BRIEF DESCRIPTION OF THE DRAWINGS

The objects and advantages of the present invention will be further clarified in the following description and appended claims and also shown on the accompanying drawings in which:

DETAILED DESCRIPTION

Figure 1:
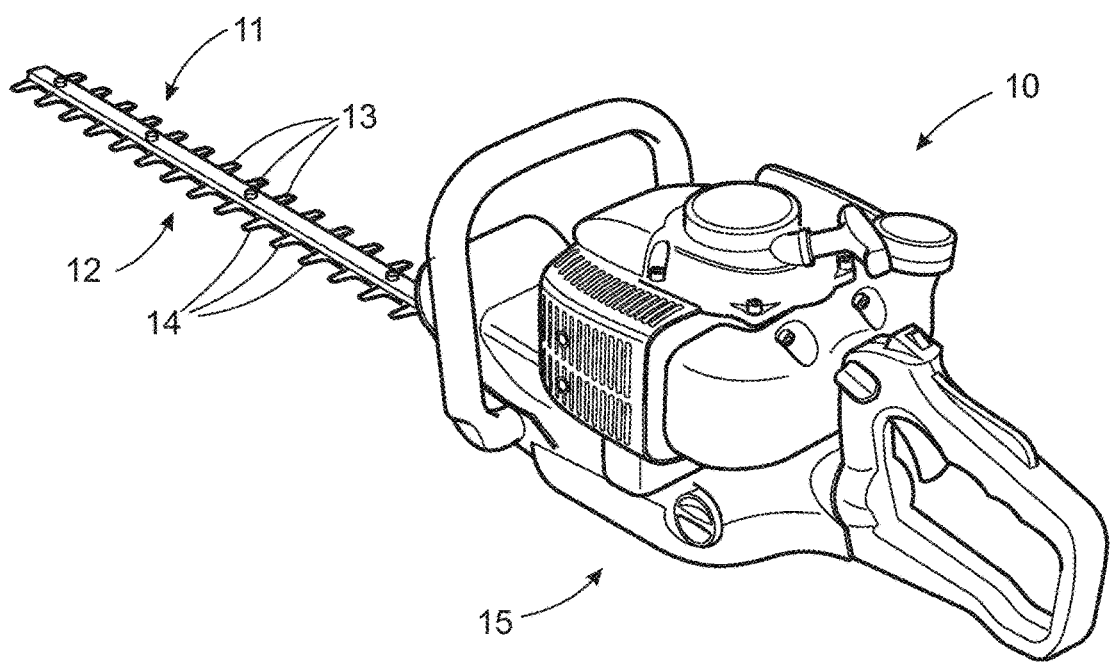
FIG. 1 shows a schematic cutting device provided with an arrangement according to the invention.

FIG. 1 shows a schematic cutting device provided with an arrangement according to the invention. The cutting device in this example is a trimmer 10 comprising a first cutting blade 11, having multiple cutting edges 13 in a first plane and a second cutting blade 12, having multiple second cutting edges 14 in a second plane. The first and second cutting blades 11, 12 are mounted so that the first and second contact surfaces are in contact with and parallel to each other; wherein at least one of the first and second cutting blades is displaceable to produce a cutting action between the first and second cutting edges. A driving unit 15 is arranged to act on at least one of the first and second cutting blades 11, 12 to produce the cutting action.

Figure 2:
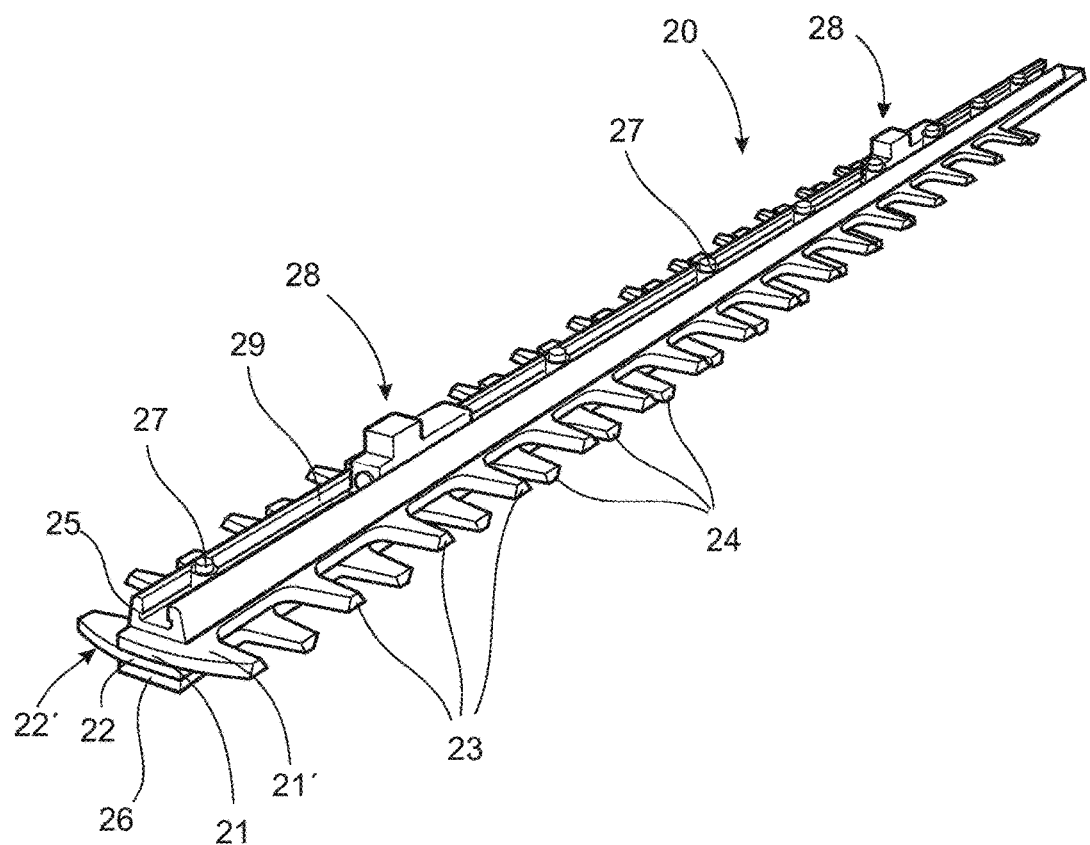
FIG. 2 shows a schematic cutting blade assembly provided with an arrangement according to the invention.

FIG. 2 shows a schematic cutting blade assembly 20 provided with an arrangement for automatic adjustment of a spacing between a first and a second cutting blade according to a first embodiment of the invention. The cutting blade assembly 20 comprises a first cutting blade 21 having multiple cutting edges 23 in a first plane and a second cutting blade 22, having multiple second cutting edges 24 in a second plane. The first and second cutting blades 21, 22 are operatively connected between an first support bar 25 and a second support bar 26 associated with a frame and a drive unit (not shown), wherein at least one of the first and second cutting blades 21, 22 is reciprocated to perform a cutting action using the cutting edges 23, 24. The first and second support bars 25, 26 are situated on the outer surfaces 21', 22' of the first and second cutting blades 21, 22, respectively. A number of bolts 27 are directed through recesses in the first cutting blades 21 and guiding slots in the second cutting blade 22. The cutting blades 21, 22 and are connected to the first support bar 25 by threaded fasteners so that the blades are held between the first support bar 25 and the heads of the bolts acting on the second support bar 26. An adjustment device 28 for automatic adjustment of the spacing between the cutting blades 21, 22 is slotted into a retaining groove 29 in the first support bar 25. The device extends through the cutting blades 21, 22 and produces a biasing force that urges the first and second planar cutting blade surfaces towards each other.

Figure 3A:
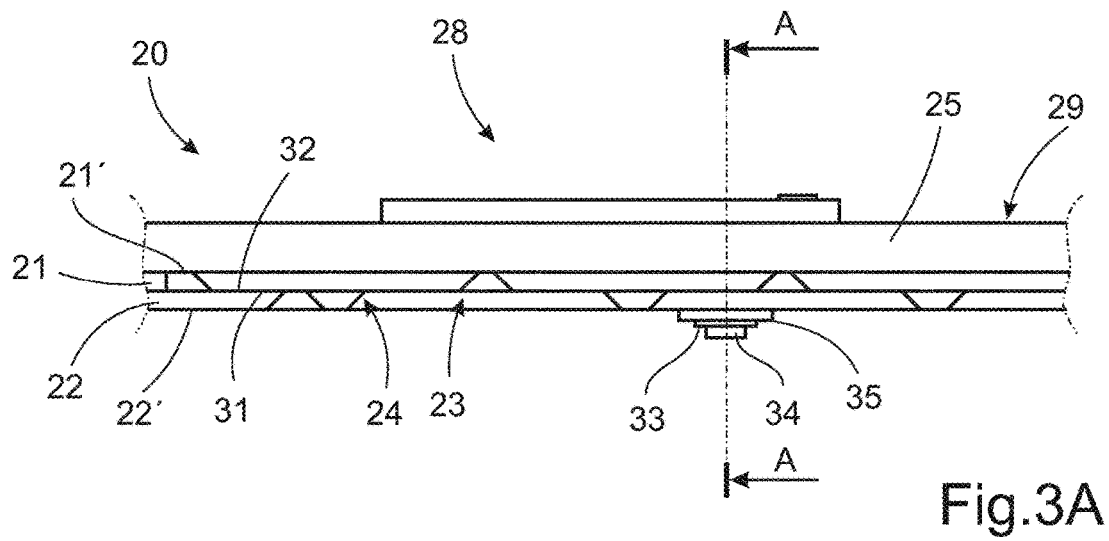
FIG. 3A shows a schematic side view of the a cutting blade assembly according to a first embodiment of the invention.

FIG. 3A shows a schematic side view of a cutting blade assembly 20 according to a first embodiment of the invention. Note that reference numbers relating to components described in earlier figures and pertaining to components not forming part of the adjustment device will be retained. FIG. 3A shows the cutting blade assembly 20 with a first cutting blade 21 and a first cutting edge 23 in a first plane forming a first contact surface 31 and a second cutting blade 22 having a second cutting edge 24 in a second plane forming a second contact surface 32. An adjustment device 28 for automatic adjustment of the spacing between the cutting blades 21, 22 is slotted into a longitudinal retaining groove 29 (see FIG. 3B) in a first support bar 25. According to this embodiment, only a first support bar 25 is provided, which support bar is in contact with the outer surface 21' of the first cutting blade 21. The device extends through the cutting blades 21, 22 and is held in place by a locking means 33 acting against a washer 35 in contact with the outer surface 22' of second cutting blade 22. The locking means 33 is attached to the end of a connector means in the form of a bolt 34 (see FIG. 3B) extending through the cutting blades 21, 22 to a portion of the adjustment device 28 on the opposite side of the cutting blades 21, 22 and the first support bar 25. In this way, a biasing force produced by the adjustment device 28 causes the first and second cutting blades 21, 22 and the support bar 25 to be drawn together and urges the contact surfaces 31, 32 of the first and second cutting blades 21, 22 towards each other. In this example the locking means 33 is a fastener in the form of a circlip fixed in a radial groove in the bolt 34, but alternative locking means such as a nut can also be used.

Figure 3B:
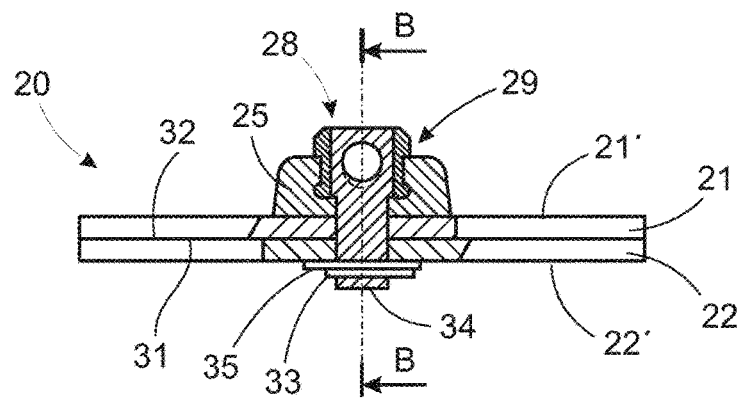
FIG. 3B shows a schematic cross-section of the cutting blade assembly in FIG. 3A.

FIG. 3B shows a cross-section A-A of the cutting blade assembly 20 in FIG. 3A. FIG. 3B shows the cutting blade assembly 20 with the first cutting blade 21 with first plane forming a first contact surface 31 and a second cutting blade 22 having a second cutting edge 24 in a second plane forming a second contact surface 32. The adjustment device 28 for automatic adjustment of the spacing between the cutting blades 21, 22 is slotted into the longitudinal retaining groove 29 in the first support bar 25. The adjustment device 28 extends through the cutting blades 21, 22 and is held in place by the locking means 33 acting against the washer 35 in contact with the outer surface 22' of second cutting blade 22. The locking means 33 is attached to the end of the bolt 34 extending through the cutting blades 21, 22 to a portion of the adjustment device 28 on the opposite side of the cutting blades 21, 22.

Figure 4:
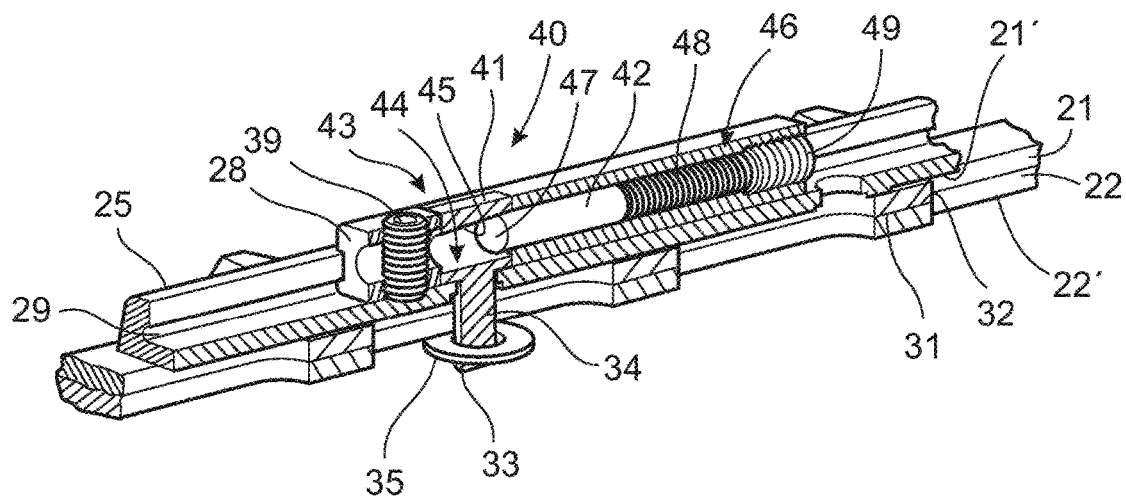
FIG. 4 shows a schematic longitudinal cross-section of an adjustment device in FIG. 3A.

FIG. 4 shows a schematic longitudinal cross-section B-B of the cutting blade assembly 20 in FIG. 3B. The adjustment device 28 comprises a first stop formed by the locking means 33, which stop is fixed to one end of the bolt 34. The stop 33 is arranged in contact with the outer surface 22' of the second cutting blade 22, via the washer 35. In this example the connector means is a bolt 34 but it can also be a suitable screw or pin, wherein the stop 33 can be a permanently fixed stop or a removably fixed circlip or nut at the end of the bolt 34. The adjustment device 28 further comprises an adjustment means 40 that is located at the opposite, second end of the bolt 34 and is arranged to apply a biasing force on the outer surface 21' of the first cutting blade 21 via the first support bar 25 and maintain the contact surfaces 31, 32 of the blades 21, 22 in contact.

The adjustment means 40 comprises a first and a second element 41, 42 having interacting control surfaces, wherein the first and second elements 41, 42 are arranged to be displaceable relative to each other. According to the example in FIG. 4, the first element 41 is arranged within the second end 43 of the connector 34 and comprises a recess 44 with a control surface in the form of an inclined surface 45 facing the first and second cutting blades 31, 32. The recess 44 extends through the second end 43 of the element 41 interconnected to the connector 34 and is arranged in the longitudinal direction of the cutting blades 21, 22. The recess 44 has a cross-section that substantially conforms to the cross-section of the second element 42 at its first end. The second element 42 is located in a portion of the adjusting device 28 attached in the retaining groove 29 in the first support bar 25 and the first cutting blade 21, wherein the cutting blade 21 and the adjusting device 28 are fixed relative to each other. In this example, the adjusting device 28 is fixed to the first support bar 25 and the cutting blade 21 by a fixing screw 39 extending through the adjusting device 28 into contact with the bottom of the retaining groove 29. The second element 42 comprises an elongated cylindrical body extending from a cavity 46 in the adjustment device 28 into the recess 44 in the first element 41. The second element 42 has a control surface 47 in the form of a hemisphere and is displaced into contact with the inclined surface 45 of the recess 44. Within the scope of the invention, the elongated body forming the second element can have any suitable shape, such as a circular pin or an elongated cylindrical, conical or rectangular wedge shaped body. The elongated cylindrical body 42 is displaceable in a plane parallel to and in the longitudinal direction of the contact surfaces 31, 32 of the cutting blades 21, 22 by a biasing means 48 located in the cavity 46 in the adjustment device 28. The biasing means 48 effecting a spring loading of the second element 42 is a coiled spring 48 located between the second end of the elongated cylindrical body 42 and the end of the cavity 46. The biasing means 48 is inserted into the cavity 46 through an opening at one end of the adjustment device 28. A set screw 49 is arranged to hold the biasing means 48 in position and can also be used for adjusting the biasing force exerted by the biasing means 48. Displacement of the elongated cylindrical body 42 causes the first element 41 to be displaced at right angles away from the contact surfaces 31, 32 of the blades, which biases the adjustment device 28 and the stop 33 at the first end of the connector 34 towards the first and the second cutting blade 21, 22, respectively, in order to maintain the spacing between the cutting blades. In this example the cutting blades are in contact, wherein the spacing is reduced to zero or near zero. An advantage of this continuous adjustment is that the spacing can be maintained without substantially increasing the contact force or friction between the blades.

Figure 5A:
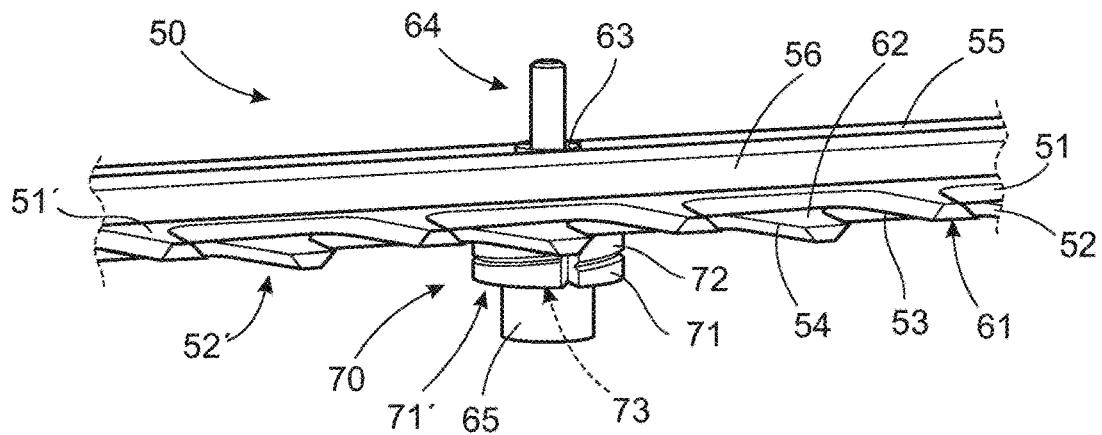
FIG. 5A shows a schematic perspective view of an adjustment device according to a second embodiment of the invention.

FIG. 5A shows a schematic perspective view of an adjustment device according to a second embodiment of the invention. FIG. 5A shows a cutting blade assembly comprising a first cutting blade 51 and a first cutting edge 53 in a first plane forming a first contact surface 61 and a second cutting blade 52 having a second cutting edge 54 in a second plane forming a second contact surface 62. The adjustment device 50 for automatic adjustment of the spacing between the cutting blades 51, 52 is attached onto the outer surfaces 51', 52' of first and second cutting blades 51, 52. The adjustment device 50 comprises a connector in the form of a bolt 64 extending through the cutting blades 51, 52 and a support bar 56 arranged along the outer surface 51' of the first cutting blade. The adjustment device 50 is held in place by a locking means 63, such as a nut, placed in and locked against rotation in a retaining groove 55 in the a support bar 56. In this example the connector is a bolt 64 but it can also be a suitable screw or pin, wherein the locking means can be a permanently fixed stop or a removably fixed nut at the end of the connector. The locking means 63 is fixedly attached to a first end of the bolt 64 extending through the cutting blades 51, 52 and the support bar 56. The bolt 64 will be described in further detail in connection with FIG. 5C.

According to the example in FIG. 5A, the adjustment device 50 comprises an adjustment means 70 in the form of first and second elements 71, 72 comprising a first and a second rotationally symmetrical body each with an opening for the bolt 64 to pass there through. The first and second bodies 71, 72 are retained by a stop 65 formed by the head of the bolt 64 and arranged in contact with the outer surface 71' of the first rotationally symmetrical body 71. A biasing means 73 (see FIG. 6A) is located between the bodies 71, 72, which biasing means is a torsion spring producing a biasing force on the adjustment device 50. The biasing force causes the adjustment means 70 and the support bar 56 to act on the outer surfaces 51', 52' of the first and second cutting blades 51, 52, forcing the cutting blades 51, 52 together and urges the planar contact surfaces 61, 62 of the first and second cutting blades 51, 52 towards each other.

Figure 5B:
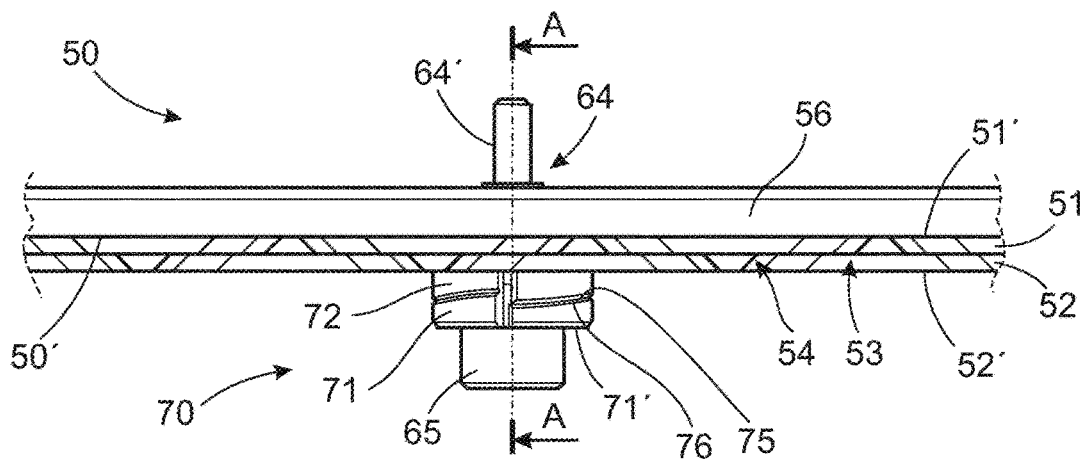
FIG. 5B shows a schematic side view of the adjustment device in FIG. 5A.

FIG. 5B shows a schematic side view of the adjustment device in FIG. 5A. FIG. 5B shows the cutting blade assembly with the first cutting blade 51 and a first cutting edge 53 in a first plane forming a first contact surface 61 and the second cutting blade 52 having a second cutting edge 54 in a second plane forming a second contact surface 62. The adjustment device 50 for automatic adjustment of the spacing between the cutting blades 51, 52 is attached onto the outer surfaces 51', 52' of first and second cutting blades 51, 52. The bolt 64 extends through the cutting blades 51, 52 and the support bar 56 arranged along the outer surface 51' of the first cutting blade. The example in FIG. 5B shows symmetrical bodies 71, 72 having inclined facing control surfaces 75, 76, each being helical and extending around the facing surfaces of the bodies 71, 72, as shown in FIG. 6A.

Figure 5C:
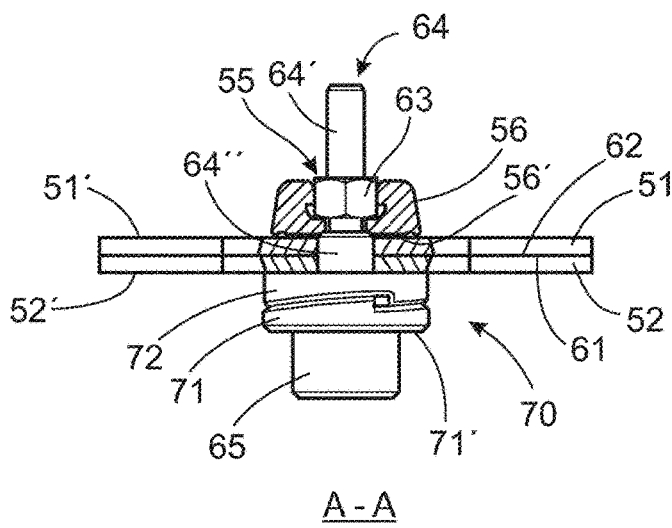
FIG. 5C shows a schematic cross-section of the adjustment device in FIG. 5B.

FIG. 5C shows a schematic cross-section A-A through the adjustment device in FIG. 5B. In this figure it can be seen how the component parts of the adjustment means 70 interact. The contact surfaces 61, 62 of the first and second cutting blades 51, 52 are maintained in contact by the biasing force exerted between the adjustment means 70, in contact with the outer surface 52' of the second cutting blade 52, and the support bar 56 connected to the adjustment means 70 by the bolt 64. In this example the connector is a bolt 64 comprising a first portion 64' being threaded and extending through the support bar 56 and the retaining groove 55 and an enlarged second portion 64" extending through the cutting blades 51, 52. The bolt is stepped, wherein the second portion 64" has a relatively larger diameter than the first, threaded portion 64'. The stepped second portion 64" has an extension or length corresponding to the combined thickness of two new cutting blades 51, 52 which have not been subjected to wear and the minimum thickness of the assembled first and second rotationally symmetrical bodies 71, 72 (see FIG. 6A). The diameter of the second portion 64' is selected so that the step between the first and second portions 64', 64" is in contact with the inner surface 56' of the support bar 56 contacting the first cutting blade 51. Consequently the second portion 64" is prevented from passing through the support bar 56 into the retaining groove 55.

Figure 6A:
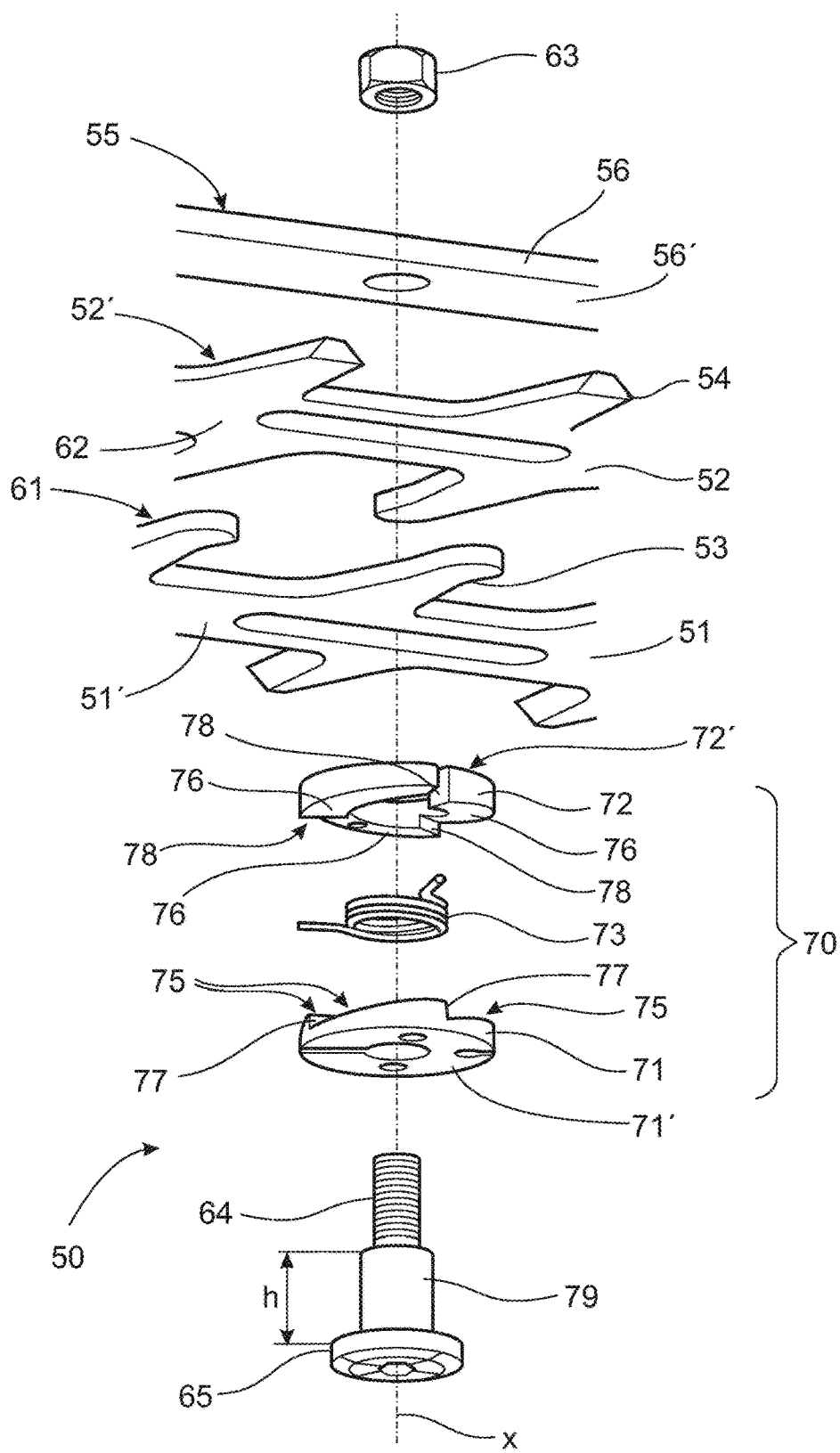
FIG. 6A-D show schematic exploded views of alternative versions of the second embodiment according to the invention.

FIG. 6A shows a schematic exploded view of the adjustment device in FIG. 5A-5C, viewed from the opposite side relative to FIG. 5A. When assembling the arrangement, a bolt 64, comprising a head 65, is inserted through recesses through the first and second bodies 71, 72. The outer surface 71' of the first body 71 is in contact with the head 65 of the bolt 64, while the outer surface 72' of the second body 72 is in contact with the first cutting blade 51. A torsion spring 73 is mounted to encircle the bolt 64, 65 between the bodies. The torsion spring 73 acts on a pair of radial surfaces 77, 78 separating each of the control surfaces 75, 76 of the bodies 71, 72. The radial surfaces 77, 78 are orthogonal to the outer surface 71' of the first body 71, which radial surfaces 77, 78 are arranged to face each other on the corresponding, assembled bodies 71, 72, wherein at least one of the bodies is rotatable relative to the other body. Each rotationally symmetrical body 71, 72 is provided with inclined contacting control surfaces 75, 76 having general helical shape, with a maxima and a minima measured from a reference surface forming a planar surface remote from the respective inclined surface. The example in FIG. 6A shows symmetrical bodies 71, 72 having three inclined control surfaces 75, 76, each being helical and extending 120° around the facing surfaces of the bodies 71, 72. The inclination of the control surfaces is selected so that the adjustment means 70 is self-locking, in order to prevent the cutting blades 51, 52 from separating during a cutting operation. The control surfaces 75, 76 are separated by three equidistant radial, orthogonal surfaces 77, 78, respectively, forming steps in a plane parallel to the rotational axis x of the body (see FIG. 6A). The torsion spring 73 exerts torque in a circular or rotating arc when the spring arms rotate about the central axis x of the torsion spring 73, which in this case coincides with the axis of the bolt 64. The rotationally symmetrical bodies 71, 72 comprise washers having a suitable thickness and being machined to provide the desired inclined helical surfaces 75, 76. Displacement of rotationally symmetrical bodies 71, 72 by the action of the torsion spring 73 against the facing radial surfaces 77, 78 will cause relative rotation of the bodies 71, 72 along the facing inclined contacting control surfaces 75, 76. The biasing force created by such a displacement will bias the adjustment means 50 and the stop 63 at the first end of the bolt 64 towards the first and the second cutting blade 51, 52, respectively, in order to maintain the spacing between the blades. The bolt 64 extending through the cutting blades 51, 52 is held in place by a locking means 63, such as a nut, located in a retaining groove 55 (see FIG. 5A) in the support bar 56. The locking means 63 is located in the retaining groove 55 and is locked against rotation by the sides of the retaining groove 55. FIG. 6A further shows that a second portion 64" of the connector 64 has an enlarged diameter with an axial extension h equal to the thickness of the cutting blades 51, 52 and the minimum thickness of the assembled first and a second rotationally symmetrical bodies 71, 72. As the blades 51, 52 are worn the reduction in thickness of the blades 51, 52 is taken up by the adjustment of the thickness performed by the relative rotation between the assembled first and a second rotationally symmetrical bodies 71, 72.

Figure 6B:
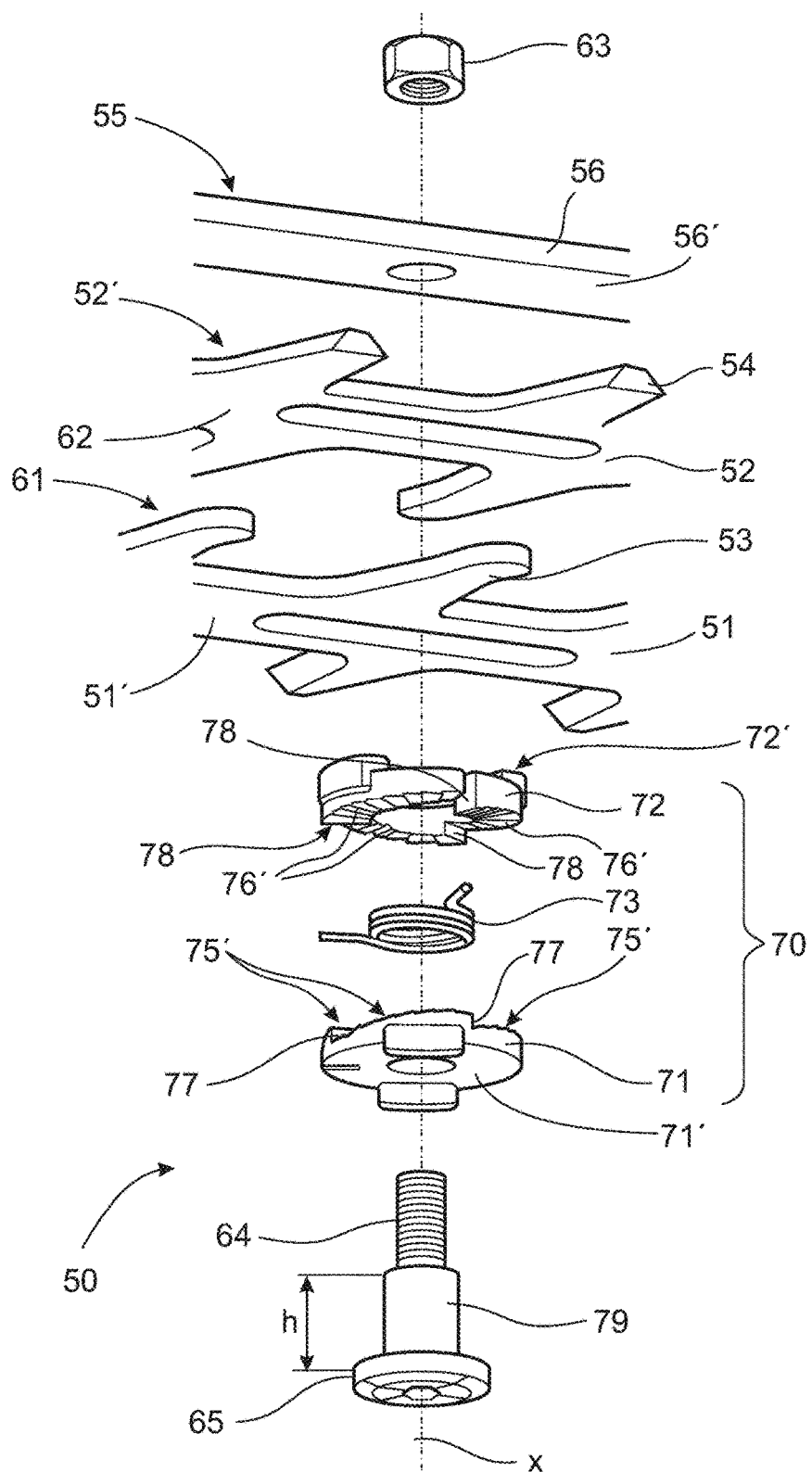

FIG. 6B shows a first alternative embodiment of the adjustment device shown in FIG. 6A. The adjustment means 70 in this figure differs from that in FIG. 6A in that it comprise three control surfaces 75', 76' having a series of steps ascending at a predetermined rate. Adjacent steps are separated by flat intermediate surfaces substantially parallel to the contact surfaces 61, 62. Depending on the desired properties of the adjustment means the rate can be constant or varying. The height of each step can be selected to represent the maximum desired spacing between the first and second contact surfaces 61, 62. The rotationally symmetrical bodies 71, 72 are pre-tensioned relative to the each other by the biasing means 73 but are prevented from relative displacement by the steps separating the intermediate surfaces. When the spacing between the cutting blades is equal to or greater than the height of the steps currently in contact, the pre-tensioning force created by the biasing means 73 will cause a displacement of one step over its corresponding facing step onto the next intermediate surface. Subsequently, relative displacement between the rotationally symmetrical bodies 71, 72 will take place over a distance corresponding to the distance between two steps, and the pre-tensioning process is resumed. In order to achieve this step-wise displacement, the contacting surfaces between facing steps can be angled or have other suitable shapes, which angles or shapes are selected dependent on factors such as the spring constant of the biasing means 73 and/or the size of the intermediate surface between two steps. If the contacting surfaces between facing steps 75', 76' are located at right angles to the intermediate surfaces, then vibrations caused by the operation of the cutting device will be sufficient to cause a displacement of one step over its corresponding facing step onto the next intermediate surface.

In this example, the contacting surfaces of the facing steps of the stepped surfaces 75', 76' form control surfaces, as facing intermediate surfaces can be out of contact with each other when the control surfaces engage. Depending on the shape of the steps, the contacting portions of the control surfaces can be in the form of an area, a line or a point. An advantage of this stepwise adjustment is that the spacing can be maintained with substantially no increase of the contact force or friction between the blades.

Figure 6C:
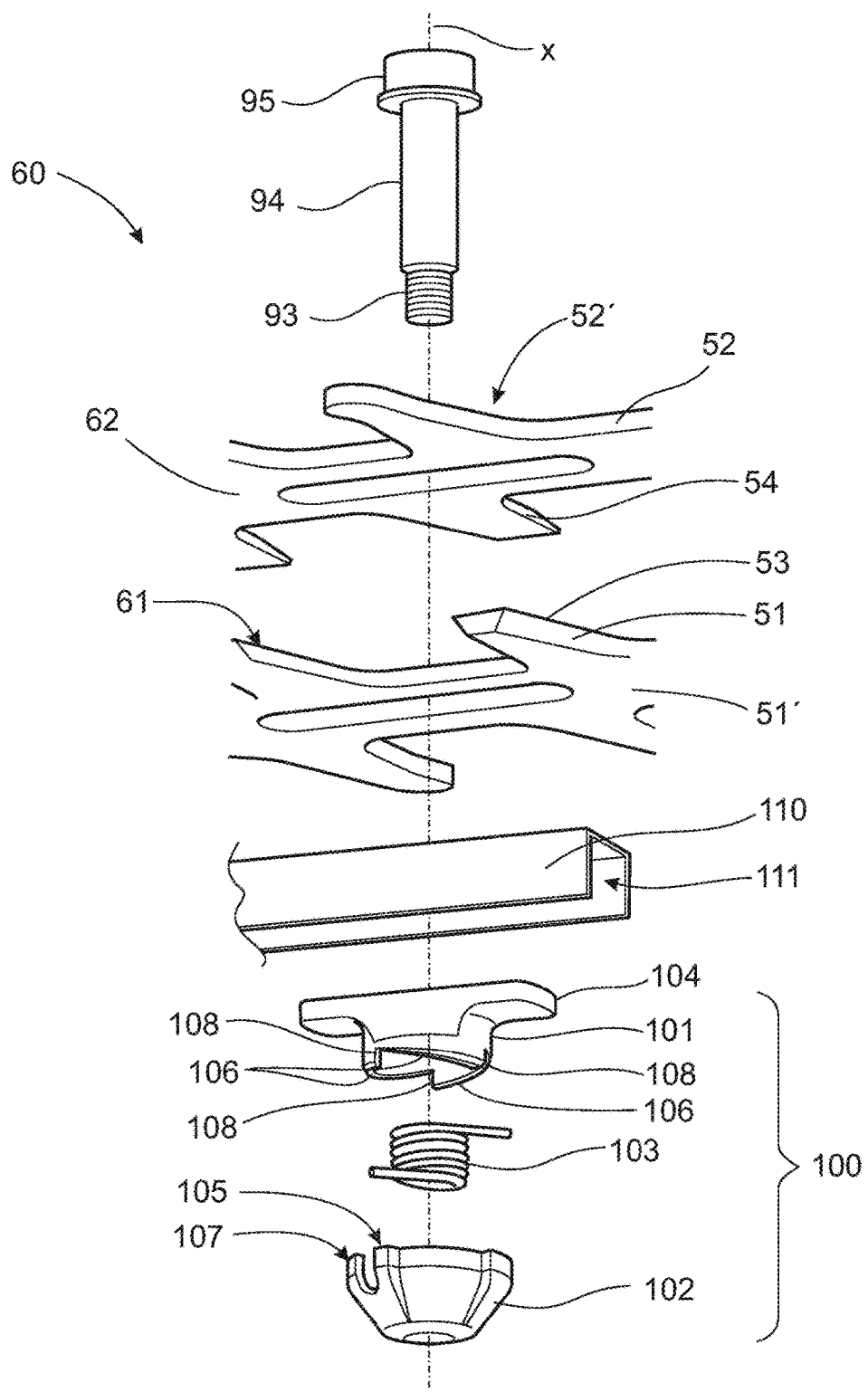

FIG. 6C second alternative embodiment of the adjustment device shown in FIG. 6A. FIG. 6C shows a cutting blade assembly comprising a first cutting blade 51 and a first cutting edge 53 in a first plane forming a first contact surface 61 and a second cutting blade 52 having a second cutting edge 54 in a second plane forming a second contact surface 62. The adjustment device 60 for automatic adjustment of the spacing between the cutting blades 51, 52 is attached onto the first cutting blade 51 via a support bar 110 in the form of a U-shaped channel 111. This U-shaped channel 111 is similar to the retaining groove in FIGS. 6A-6B. The adjustment device 60 comprises a connector in the form of a bolt 94 extending through the cutting blades 51, 52 and is held in place by a locking means 102 that forms part of the adjusting means 100.

According to the example in FIG. 6C, the adjustment device 60 comprises an adjustment means 100 in the form of first and second elements 101, 102 comprising a first and a second rotationally symmetrical surface.

The bolt 94 passes through the first body 101 and into the second body 102, which is retained by a threaded section at the end of the bolt 94. This attachment established a fixed connection between the head 95 of the bolt and the second body 102. The first body 101 is held against rotation in the U-shaped channel 111, while the second body 102 is fixed at the end of the bolt 94. A biasing means 103 is located between facing control surfaces 105, 106 of the bodies 101, 102, which biasing means is a torsion spring 103 acting on a pair of radial surfaces 107, 108 orthogonal to the contact surfaces 61, 62 of the first and second cutting blades 51, 52. The facing radial surfaces 107, 108 are arranged to face each other on the corresponding, assembled bodies 101, 102.

Each body 101, 102 is provided with rotationally symmetrical inclined contacting control surfaces 105, 106, respectively, having general helical shape, with a maxima and a minima measured from a reference surface forming a planar surface remote from the respective inclined surface. The example in FIG. 6C shows the first and second bodies 101, 102 having three inclined control surfaces 105, 106, each being helical and extending 120° around the facing surfaces of the bodies 101, 102. The control surfaces 105, 106 are separated by three equidistant radial, orthogonal surfaces 107, 108, respectively, forming steps in a plane parallel to the rotational axis x of the body. The torsion spring 103 exerts torque in a circular or rotating arc when the spring arms rotate about the central axis x of the torsion spring 103, which in this case coincides with the axis of the bolt 94. Displacement of the second body 102 by the action of the torsion spring 103 against the facing radial surfaces 107, 108 will cause relative rotation of the bodies 101, 102 along the facing inclined contacting control surfaces 105, 106. The biasing force created by such a displacement will bias the adjustment means 100 with its the second body 102 towards the head 95 of the bolt to displace the first and the second cutting blade 51, 52 towards each other, in order to maintain the spacing between the blades.

Figure 6D:
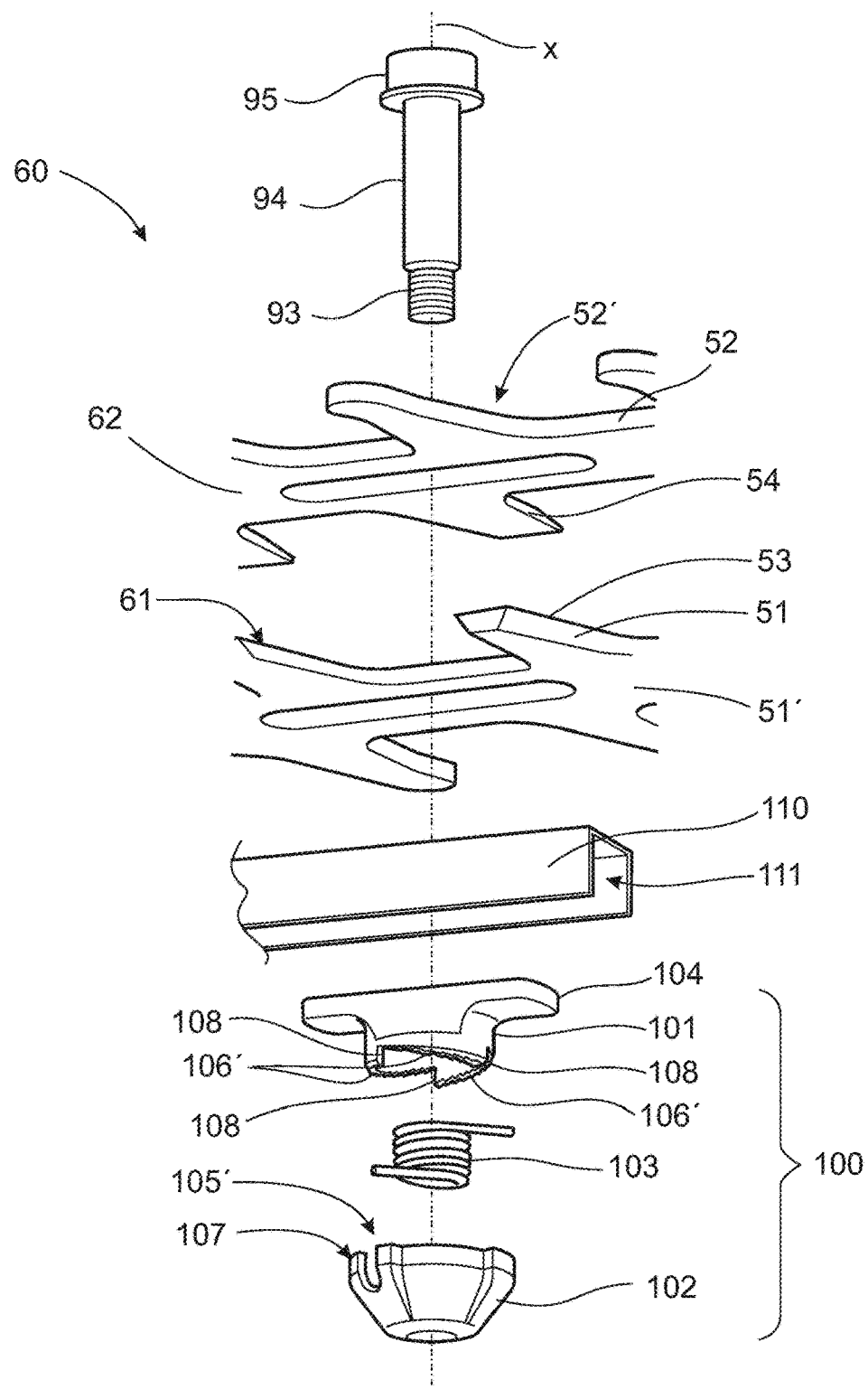

FIG. 6D shows a third alternative embodiment of the adjustment device shown in FIG. 6C. This adjustment means 100 in this figure differs from that in FIG. 6C in that it comprise three stepped control surfaces 105', 106' having a series of steps ascending at a predetermined rate. Adjacent steps are separated by flat intermediate surfaces substantially parallel to the contact surfaces 61, 62. Depending on the desired properties of the adjustment means the rate can be constant or varying. The height of each step in the axial direction of the bolt 94 can be selected to represent the maximum desired spacing between the first and second contact surfaces 61, 62. The first and second bodies 101, 102 are pre-tensioned relative to the each other by the biasing means 103 but are prevented from relative displacement by the steps separating the intermediate surfaces. When the spacing is equal to or greater than the height of the steps currently in contact, the pre-tensioning force created by the biasing means 103 will be sufficient to force one step over its corresponding facing step onto the next intermediate surface. Subsequently, displacement of the second body 102 will take place over a distance corresponding to the distance between two adjacent steps, and the pre-tensioning process is resumed. In order to achieve this step-wise displacement, the contacting surfaces between facing steps can be angled or have other suitable shapes, which angles or shapes are selected dependent on factors such as the spring constant of the biasing means 103 and/or the size of the intermediate surface between two steps 105', 106'. In this example, the contacting surfaces between facing steps form control surfaces, as facing intermediate surfaces will be out of contact with each other when the control surfaces engage. Depending on the shape of the steps, the contacting portions of the control surfaces can be in the form of an area, a line or a point. This stepwise adjustment allows the spacing to be maintained without increasing the contact force or friction between the blades.

Figure 7A:
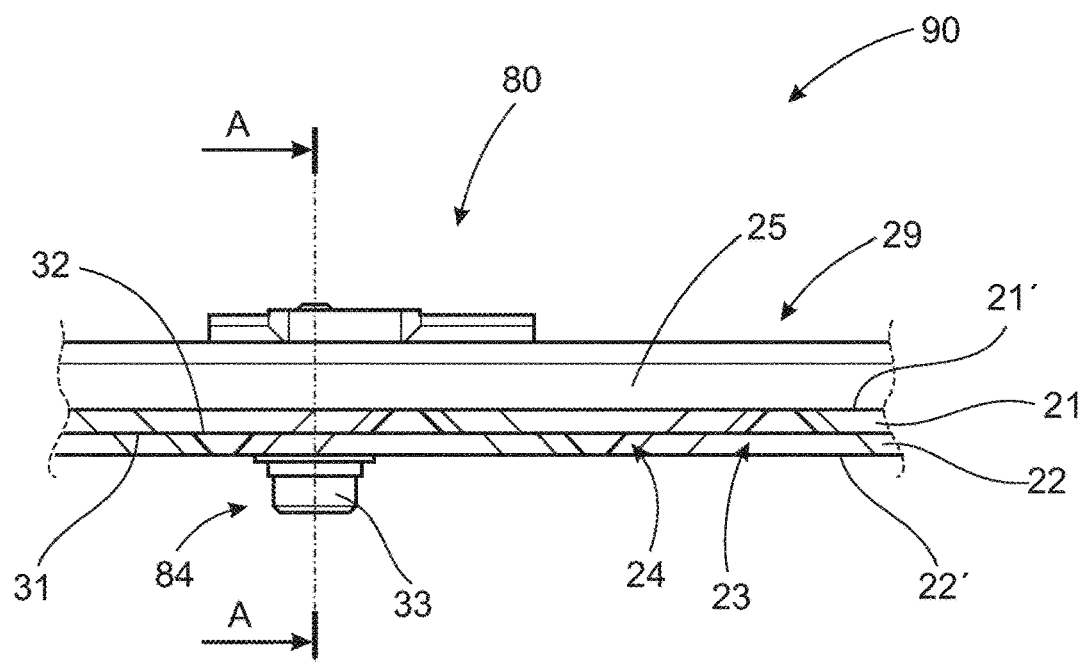
FIG. 7A shows a schematic side view of a cutting blade assembly according to a third embodiment of the invention.

FIG. 7A shows a schematic side view of a cutting blade assembly according to a third embodiment of the invention. FIG. 7A shows a cutting blade assembly with a first cutting blade 21 and a first cutting edge 23 in a first plane forming a first contact surface 31 and a second cutting blade 22 having a second cutting edge 24 in a second plane forming a second contact surface 32. An adjustment means 80 for automatic adjustment of the spacing between the cutting blades 21, 22 is slotted into a longitudinal retaining groove 29 (see FIG. 7B) in a first support bar 25. According to this embodiment, only a first support bar 25 is provided, which support bar is in contact with the outer surface 21' of the first cutting blade 21. The adjustment device 90 extends through the cutting blades 21, 22 and is held in place by a locking means 33, such as a nut, screw, bolt, etc., acting against the outer surface 26' of the second support bar 26. In this example the locking means 33 is the head of a bolt 84 forming a connector extending through the cutting blades 21, 22 to the adjustment means 80 on the opposite side of the cutting blades 21, 22. In this way, a biasing force produced by the adjustment device 90 causes the first and second support bars 25, 26 to be drawn together and urges the planar contact surfaces 31, 32 of the first and second cutting blades 21, 22 towards each other.

Figure 7B:
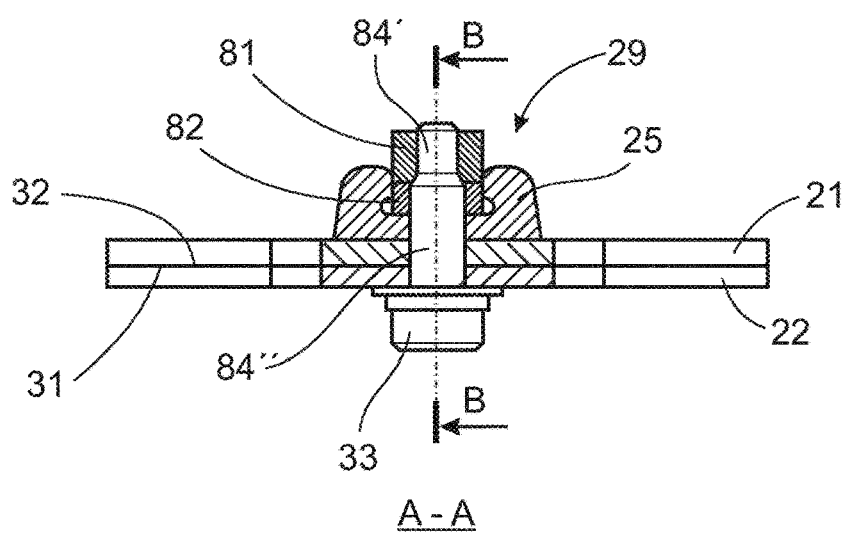
FIG. 7B shows a schematic cross-section of the cutting blade assembly in FIG. 7A.

FIG. 7B shows a schematic cross-section A-A of the cutting blade assembly in FIG. 7A. Contact surfaces 31, 32 of the respective first and second cutting blades 51, 52 are maintained in contact by the biasing force exerted between the adjustment means 80, in contact with the outer surface 51' of the first cutting blade 51 via the support bar 25, and the locking means 33 of the bolt 64, in contact with the outer surface 52' of the second cutting blade 52. In this example the connector is a bolt 84 comprising a first portion 84' being threaded and extending through the retaining groove 29, where it is attached to a first element 81 of the adjustment means 80. A second portion 84" of the bolt is an enlarged portion extending through the cutting blades 51, 52, the support bar 25 and a displaceable second element 82 of the adjustment means 80. The bolt is stepped, wherein the second portion 84" has a relatively larger diameter than the first, threaded portion 84'. When the bolt 84 is mounted, the step between the first and second portions 84', 84" contacts the first element 81 of the adjustment means 80. Hence, the enlarged second portion 84" of the bolt 84 has an axial extension equal to the combined thickness of the cutting blades 51, 52 and the intermediate parts of the support bar 25 and the displaceable second element 82. As the blades 51, 52 are worn the reduction in thickness of the blades 51, 52 is taken up by the adjustment of the thickness performed by the displacement of the second element 82 relative to the first element 81.

Figure 8A:
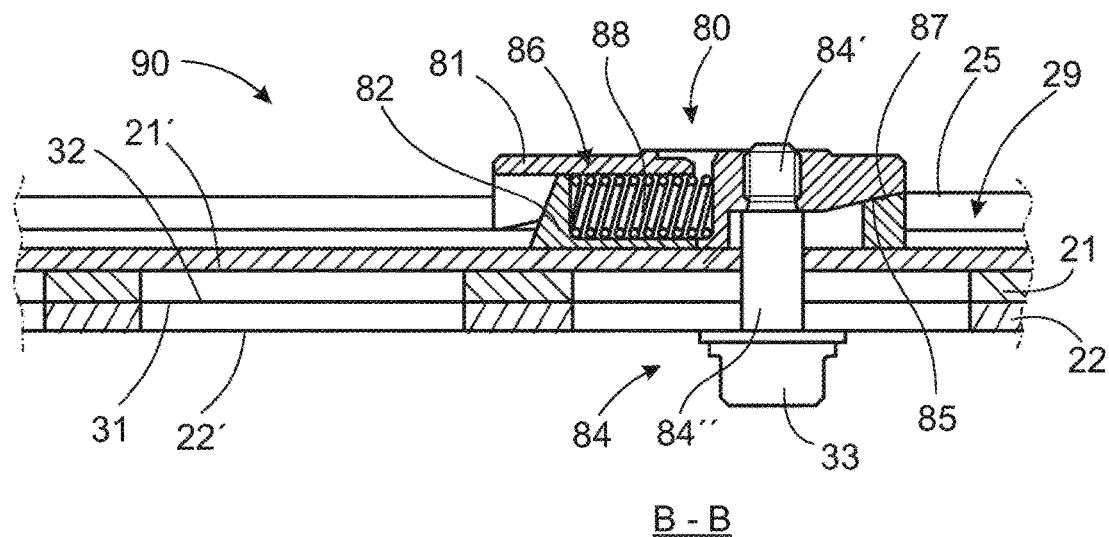
FIG. 8A shows a schematic cross-section of an adjustment device according to the third embodiment of the invention.

FIG. 8A shows a schematic cross-section B-B of the adjustment device 90 in FIG. 7B. The adjustment device 90 comprises a first stop or a locking means 33, which stop is fixed to a first end of a connector 84, in this case a bolt. The locking means 33 is the head of the bolt and is arranged in contact with the outer surface 22' of the second cutting blade 22. In this example the connector is a bolt 84 but it can also be a suitable screw or pin, wherein the stop 33 can be a permanently fixed stop or a removably fixed nut at the end of the connector. The adjustment device 90 further comprises an adjustment means 80 that is located at the opposite end of the connector 84 and is arranged to apply a biasing force on the support bar 25 contacting the outer surface 21' of the first cutting blade 21 and maintain the contact surfaces 31, 32 of the blades 21, 22 in contact.

The adjustment means 80 comprises the first and second elements 81, 82 having interacting control surfaces 85, 87, wherein the first and second elements 81, 82 are arranged to be in contact with and displaceable relative to each other. According to the example in FIG. 8A, the first element 81 is attached to the threaded first portion 84' of the bolt 84 and comprises a first contacting control surface 85 in the form of an inclined surface facing the first and second cutting blades 31, 32. The second element 82 forms a displaceable portion of the adjusting means 80 and is slidable in the retaining groove 29 in the first support bar 25. A cavity 86 is formed between the first element 81 and the second element 82, wherein a biasing means 88 is located in the cavity 86 in the adjustment means 80. The biasing means 88 effects a spring loading of the first element 81 relative to the second element 82. The biasing means 88 is a coiled spring located between a first stop on the first element 81 and a second stop on the second element 82, which stops are located at opposite ends of the cavity 86. The second element 82 has a second contacting control surface 87 in the form of an inclined surface facing the first element 81. The control surface 87 on the second element 82 is displaced into contact with the inclined surface 85 of the first element 81 by the biasing means 88. Within the scope of the invention, the control surface 87 of the second element 82 can have any suitable shape, such as an angled or curved surface, for cooperating with the inclined surface 85 on the first element 81. The second element 82 is displaceable in a plane parallel to and in the longitudinal direction of the cutting blades 21, 22 by the biasing means 88 located in the cavity 86 in the adjustment means 80. Displacement of the second element 82 causes the second element 82 to be displaced at right angles to and away from the fixed first element 81, which biases the second element 82 and the locking means 33 at the first end of the connector 84 towards the outer surfaces 21', 22' of the first and the second cutting blade 21, 22, respectively, in order to maintain the spacing between the cutting blades.

Figure 8B:
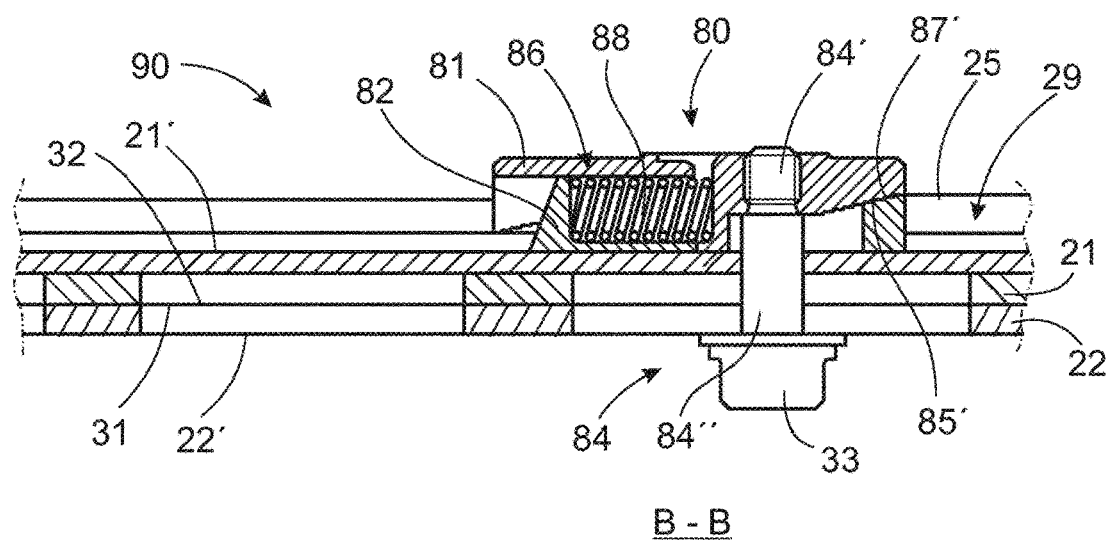
FIG. 8B shows a schematic cross-section of an adjustment device according to a first alternative version of the third embodiment of the invention.

FIG. 8B shows a further schematic cross-section B-B of an adjustment device according to a first alternative version of the third embodiment of the invention as shown in FIG. 8A. The arrangement in FIG. 8B differs from that in FIG. 8A in that the first element 81 attached to the threaded first portion 84' of the bolt 84 comprises a first contacting control surface 85' in the form of a stepped surface facing the first and second cutting blades 31, 32. Similarly, the second element 82 has a second contacting control surface 87' in the form of a stepped surface facing the first element 81. Both control surfaces 85', 87' have a series of steps ascending at a predetermined rate. Adjacent steps along the stepped control surfaces 85', 87' are separated by flat intermediate surfaces substantially parallel to the contact surfaces 31, 32 between the cutting blades 21, 22. The height of each step can be selected to represent the maximum desired spacing between the first and second contact surfaces 31, 32. The first and second elements 81, 82 are pre-tensioned relative to the each other by the biasing means 88 but are prevented from relative displacement by the steps separating the intermediate surfaces. When the spacing between the cutting blades 21, 22 is equal to or greater than the height of the steps currently in contact, the pre-tensioning force created by the biasing means 88 will cause a displacement of one step over its corresponding facing step onto the next intermediate surface. Subsequently, displacement of the second element 82 relative to the first element 81 will take place over a distance corresponding to the distance between two steps, and the pre-tensioning process is resumed. In order to achieve this step-wise displacement, the contacting surfaces between facing steps can be angled or have other suitable shapes, which angles or shapes are selected dependent on factors such as the spring constant of the biasing means 88 and/or the size of the intermediate surface between two steps. If the contacting surfaces between facing steps are located at right angles to the intermediate surfaces, then vibrations caused by the operation of the cutting device will be sufficient to cause a displacement of one step over its corresponding facing step onto the next intermediate surface.

In this example, the contacting surfaces of the facing steps form control surfaces, as facing intermediate surfaces can be out of contact with each other when the control surfaces engage. Depending on the shape of the steps the contacting portions of the control surfaces can be in the form of an area, a line or a point. An advantage of this stepwise adjustment is that the spacing can be maintained with substantially no increase of the contact force or friction between the blades.

The invention is not limited to the above examples, but may be varied freely within the scope of the claims. For instance, the adjustment devices described in the above embodiments can be placed with the adjustment means on any side of a blade assembly, that is, it may be located on an upper or on a lower side of a blade assembly as indicated in FIG. 1. If multiple adjustment devices are used, then the adjustment means can all be located on one side or be located on alternate sides in any suitable combination. The location of the adjustment means can be determined by factors such as design constraints or access for servicing. Further, one or more adjustment devices can comprise an adjustment means on both sides of a blade assembly. This arrangement would extend the possible distance for adjustment and/or ensure that adjustment can be performed even if one adjustment means should become clogged by debris.

The invention claimed is:

1. An adjustment device for adjustment of a spacing between a first and a second cutting blade for a cutting device; the first cutting blade comprising a planar first contact surface, an opposite first outer surface, and at least one first cutting edge in a first plane; and the second cutting blade comprising a planar second contact surface, an opposite second outer surface, and at least one second cutting edge in a second plane, wherein the first contact surface and the second contact surface are facing and aligned with each other; the first and second cutting blades being interconnected by the adjustment device arranged to maintain the spacing between the first and second contact surfaces; the adjustment device comprising:
   a connector extending through a recess in the respective first and second cutting blades;
   a first stop arranged at one end of the connector and arranged proximate with the second outer surface of the second cutting blade; and
   an adjuster located at the opposite end of the connector and arranged to act on the first outer surface of the first cutting blade and maintain the spacing between the first and second contact surfaces;
   wherein the adjuster comprises a first and a second element, each of the first and second elements having an inner control surface and an outer surface opposite the inner control surface,
   wherein the inner control surface of at least one of the first or second element is an inclined control surface and configured to engage with the inner control surface of the other of the first or second element,
   wherein the first and second elements are arranged to be displaceable relative to each other;
   wherein the inclined control surface is arranged at an angle to the first and second contact surfaces of the first and second cutting blades;
   wherein the adjuster further comprises a biasing element positioned coaxial with the connector and having a central aperture, the biasing element being disposed between the inner control surface of the first element and the inner control surface of the second element to effect a relative displacement between the first and second elements,
   wherein the relative displacement between the first and second elements occurs along said inclined control surface, and
   wherein the connector extends through the central aperture of the biasing element.

2. The device according to claim 1, wherein in response to the inner control surfaces being engaged, the inner control surfaces are self-locking in the direction of the connector and separation of the first and second cutting blades is inhibited.

3. The device according to claim 1, wherein the inclined control surface comprises a series of steps ascending at a predetermined rate.

4. The device according to claim 1, wherein both the first and the second elements have the inclined control surface.

5. The device according to claim 1, wherein at least one of the first and second elements is arranged to be displaceable in a plane parallel to the first and second contact surfaces.

6. The device according to claim 1, wherein at least one of the first and second elements is arranged to be displaced along the inclined control surface wherein a distance between the first stop and the adjuster is reduced.

7. The device according to claim 1, wherein the biasing member is a torsion spring located on the connector.

8. The device according to claim 1, wherein the first stop comprises a second adjuster.

9. The device according to claim 1, wherein a portion of the connector adjacent the biasing member has an enlarged diameter with an axial extension equal to a thickness of the first and second cutting blades and a minimum thickness of the first and the second rotationally symmetrical bodies in an assembled state.

10. A cutting device comprising:
- a first cutting blade comprising a planar first contact surface, an opposite first outer surface, and at least one first cutting edge in a first plane;
- a second cutting blade comprising a planar second contact surface, an opposite second outer surface, and at least one second cutting edge in a second plane, wherein the first and second cutting blades are mounted so that the first and second contact surfaces are in contact with and parallel to each other;
- a driving unit arranged to act on at least one of the first and second cutting blades to move the blades relative to each other; and
- an adjustment device interconnecting the first and second cutting blade, the adjustment device comprising:
  - a connector extending through a recess in the respective first and second cutting blades;
  - a first stop arranged at one end of the connector and arranged proximate with the second outer surface of the second cutting blade; and
  - an adjuster located at the opposite end of the connector and arranged to act on the first outer surface of the first cutting blade and maintain the spacing between first and second contact surfaces;
  - wherein the adjuster comprises a first and a second element, each of the first and second elements having an inner control surface and an outer surface opposite the inner control surface,
  - wherein the inner control surface of at least one of the first or second element is an inclined control surface and configured to engage with the inner control surface of the other of the first or second element,
  - wherein the first and second elements are arranged to be displaceable relative to each other;
  - wherein the inclined control surface is arranged at an angle to the contact surfaces of the first and second cutting blades;
  - wherein the adjuster further comprises a biasing element positioned coaxial with the connector and having a central aperture, the biasing element being disposed between the inner control surface of the first element and the inner control surface of the second element to effect a relative displacement between the first and second elements,
  - wherein the relative displacement between the first and second elements occurs along said inclined control surface, and
  - wherein the connector extends through the central aperture of the biasing element.

11. The cutting device according to claim 10, wherein the cutting device is one of a powered hedge trimmer, a manual hedge trimmer, a cutting bar and gardening or industrial scissors.

12. The cutting device according to claim 10, wherein the cutting device further comprises a support bar, wherein the support bar is arranged along the first outer surface of the first blade.

13. The cutting device according to claim 12, wherein the support bar comprises a first surface and a second surface opposite from the first surface, wherein the first surface of the support bar is arranged along the first outer surface of the first blade, and wherein the adjustment device further comprises a locking means configured to prevent rotation of the adjustment device, and wherein the locking means is arranged in contact with the second surface of the support bar.

* * * * *